United States Patent
Kempf

(10) Patent No.: US 7,252,615 B2
(45) Date of Patent: Aug. 7, 2007

(54) LUBRICATION SYSTEM AND METHOD FOR HYBRID ELECTRO-MECHANICAL PLANETARY TRANSMISSION COMPONENTS

(75) Inventor: Gregory W. Kempf, Avon, IN (US)

(73) Assignees: General Motors Corporation, Detroit, MI (US); Daimler Chrysler AG, Stuttgart (DE); Daimler Chrysler Corporation, Auburn Hills, MI (US)

( * ) Notice: Subject to any disclaimer, the term of this patent is extended or adjusted under 35 U.S.C. 154(b) by 147 days.

(21) Appl. No.: 11/035,344

(22) Filed: Jan. 13, 2005

(65) Prior Publication Data

US 2005/0209039 A1    Sep. 22, 2005

Related U.S. Application Data

(60) Provisional application No. 60/555,141, filed on Mar. 22, 2004.

(51) Int. Cl.
F16H 57/04 (2006.01)
(52) U.S. Cl. .................................................. 475/159
(58) Field of Classification Search ............... 475/159, 475/331, 346, 347; 74/467, 468; 184/6.12
See application file for complete search history.

(56) References Cited

U.S. PATENT DOCUMENTS

| | | | | |
|---|---|---|---|---|
| 4,380,179 A | * | 4/1983 | Kubo et al. ................. | 475/159 |
| 4,719,818 A | * | 1/1988 | McCreary ................... | 475/159 |
| 4,776,237 A | * | 10/1988 | Premiski et al. ............ | 475/159 |
| 5,188,576 A | * | 2/1993 | Maguire et al. ............ | 475/348 |
| 5,910,063 A | * | 6/1999 | Kato ........................... | 475/159 |
| 5,928,100 A | * | 7/1999 | Ohtake et al. .............. | 475/159 |
| 6,817,962 B2 | * | 11/2004 | Tanikawa .................... | 475/159 |
| 2005/0143215 A1 | * | 6/2005 | Fugel .......................... | 475/331 |

FOREIGN PATENT DOCUMENTS

JP         405141484 A  *  6/1993  ................. 475/348

* cited by examiner

*Primary Examiner*—Roger Pang

(57) ABSTRACT

This invention details a lubrication system for an automatic transmission, specifically the bearings of the planetary pinion gears. The planetary carriers have grooves formed in spider and flange sections thereof to carry the lubricating material from the inner diameter of the planetary carrier to the inner diameter of each pinion gear bearing mounted in the planetary carrier. The invention further includes two thrust washers that are assembled on opposing sides of each pinion gear that have axially and radially extending slots that further carry the oil between the inner diameter of the planetary carrier and the outer diameter of the planetary carrier. Lastly, the invention discloses a method for lubricating the pinion gears of the planetary carrier.

15 Claims, 3 Drawing Sheets

LUBRICATION SYSTEM AND METHOD FOR HYBRID ELECTRO-MECHANICAL PLANETARY TRANSMISSION COMPONENTS

CROSS-REFERENCE TO RELATED APPLICATIONS

This application claims the benefit of U.S. Provisional Application 60/555,141 filed Mar. 22, 2004.

TECHNICAL FIELD

This invention relates to a means of lubricating a hybrid electro-mechanical transmission, and more particularly the pinion gear bearing components of the planetary carrier.

BACKGROUND OF THE INVENTION

Power transmissions require oil or other lubricating materials to carry away thermal energy dissipated by the power transmission components. This is especially true for electromechanical transmissions having an electric motor housed inside the transmission. The lubricating oil originates in an oil reserve and is directed by a pump that distributes the oil centrifugally throughout the transmission. The operating temperatures of the bearing components supporting the planetary gear loads can be of considerable concern. To ensure sufficient lube oil flow to the intended internal components, the transmission design has to be carefully considered to provide sufficient oil flow to components along the entire length of the transmission.

An electro-mechanical transmission is described and commonly assigned U.S. Provisional Ser. No. 60/531,528 entitled "Two-Mode Compound-Split, Hybrid Electro-Mechanical Transmission Having Four Fixed Ratios," Schmidt et al., filed Dec. 19, 2003 and hereby incorporated by reference in its entirety.

SUMMARY OF THE INVENTION

The present invention is a hybrid electromechanical automatic transmission with a lubrication system that provides the appropriate cooling to the planetary carrier and its components. More specifically, this invention includes a supply of lubricating oil (or transmission fluid), which travels through the main shaft of the transmission from the reservoir and towards the planetary carrier. The main shaft has radial apertures to direct the lubricating oil from the main shaft towards the planetary carrier. A sun gear shaft, which encircles the main shaft and receives the lubricating oil from the main shaft, is also included. The sun gear shaft has radial apertures as well to direct the lubricating oil towards the planetary carrier. A seal and/or bushing is included between the sun gear and the main shaft and is operative to support the sun gear and substantially prevent the lubricating oil from flowing away from the planetary carrier.

The planetary carrier assembly consists of the planetary carrier, several pinion gears, pinion bearings and thrust washers. The planetary carrier is made of a spider and flange section, which encase the pinion gears. Thrust washers are on both sides of the pinion gears to react any thrust loading. The spider section has an annular machined groove (or first groove), which catches and directs the lubricant into a pocket which abuts a radially extending formed groove (or second groove) at the inner most diameter of the planetary carrier. A first thrust washer—containing both radially and axially extending grooves—receives the lubricating oil and directs the lube oil towards the pinion bearings. After flowing along the pinion bearings, a second thrust washer—located adjacent to the flange section of the planetary carrier—transfers the lubricating oil from the planetary carrier. This ensures that the majority of the lube oil is used for pinion bearing lubrication.

In one aspect of the present invention, the grooves in the planetary carrier are formed in the planetary carrier by a powder metallurgy process. However, in another aspect of the invention at least one groove in the planetary carrier is machined into the carrier.

In another aspect of the invention, the apertures in the main shaft and sun gear shaft are designed to be small enough to maintain a predetermined pressure level in the planetary carrier cavity while being large enough to permit the passage of the lubricating material.

Finally, the invention includes a method of lubricating the planetary carrier. The steps of the method include: directing a lubricating material from a supply in the transmission to the main shaft; further directing the lubricating material from the main shaft to the sun gear shaft which has radially extending apertures through which the lubricating material can flow; directing the lubricating material through the apertures of the sun gear shaft to a planetary carrier having a grooved spider section and a grooved flange section; receiving the lubricating material from the interior of the sun gear shaft in the grooves of the spider section of the planetary carrier; directing the lubricating material along the grooves in the spider section of the planetary carrier to a first thrust washer having an axial slot; receiving the lubricating material; carrying the lubricating material through the axial slot in the first thrust washer into the pinion bearing; directing the lubricating material across the pinion bearings to a second thrust washer located at the flange side of the planetary carrier which has an axial slot for receiving the lubricating material from the pinion bearing; directing the lubricating material received from the pinion bearings through the axial slot in the second thrust washer to a groove in the flange section; and carrying the lubricating material away from the planetary carrier through the groove in the flange section of the planetary carrier and onto other transmission components.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
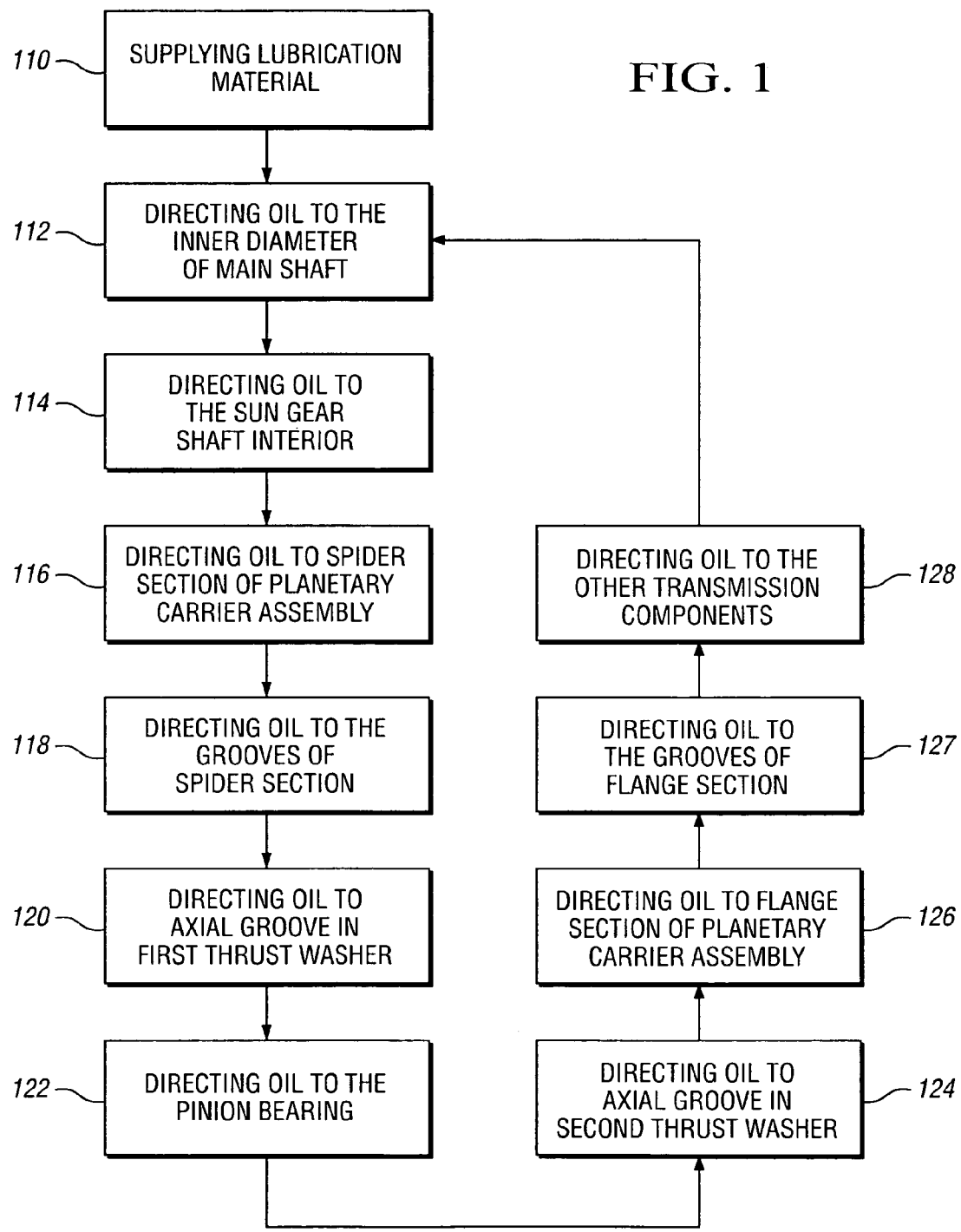
FIG. 1 is a block diagram for directing lubricating material through an automatic transmission to sufficiently cool the pinion bearings of the planetary carrier.

Referring to the drawings, FIG. 1 schematically illustrates a method for directing lubricating material through an automatic planetary transmission to sufficiently cool the pinion gears of the planetary carrier. First, the lubricating material (oil or other reasonably appropriate transmission fluids) is supplied to the transmission at step 110 through an inlet on the exterior of the transmission housing where the lubricating material is then directed from the supply to the inner diameter of the main shaft at step 112. Next, the lubricating material is directed from the main shaft to the interior of the sun gear shaft at step 114 where the oil travels along the sun gear and its neighboring components. From the sun gear the oil is directed to the spider section of the planetary carrier at step 116. The planetary carrier, being configured with machined and formed grooves, receives the lubricating material and directs the lubricating material into the grooves of the spider section at step 118. Next, the oil is directed into the axial slots (56 shown in FIGS. 1, 2 and 3) of the first thrust washer (50) at step 120. From the first thrust washer the lubricating material is directed axially and radially to the pinion bearings and the spindle of the pinion gear to specifically cool that area of the planetary carrier at step 122. The oil is then directed to a second thrust washer (62) at step 124, which directs the oil axially through axial slots 56 in the thrust washer to the flange section (28 shown in FIGS. 1, 2, 4a and 4b) of the planetary carrier at step 126. The oil is then directed radially outward, at step 127, through grooves (65 shown in FIG. 4a) in the flange section 28. Finally, the oil is dispersed to components adjacent to the planetary carrier (16) at step 128 and directed back to the sump (or supply) to repeat the process at 112.

Figure 2:
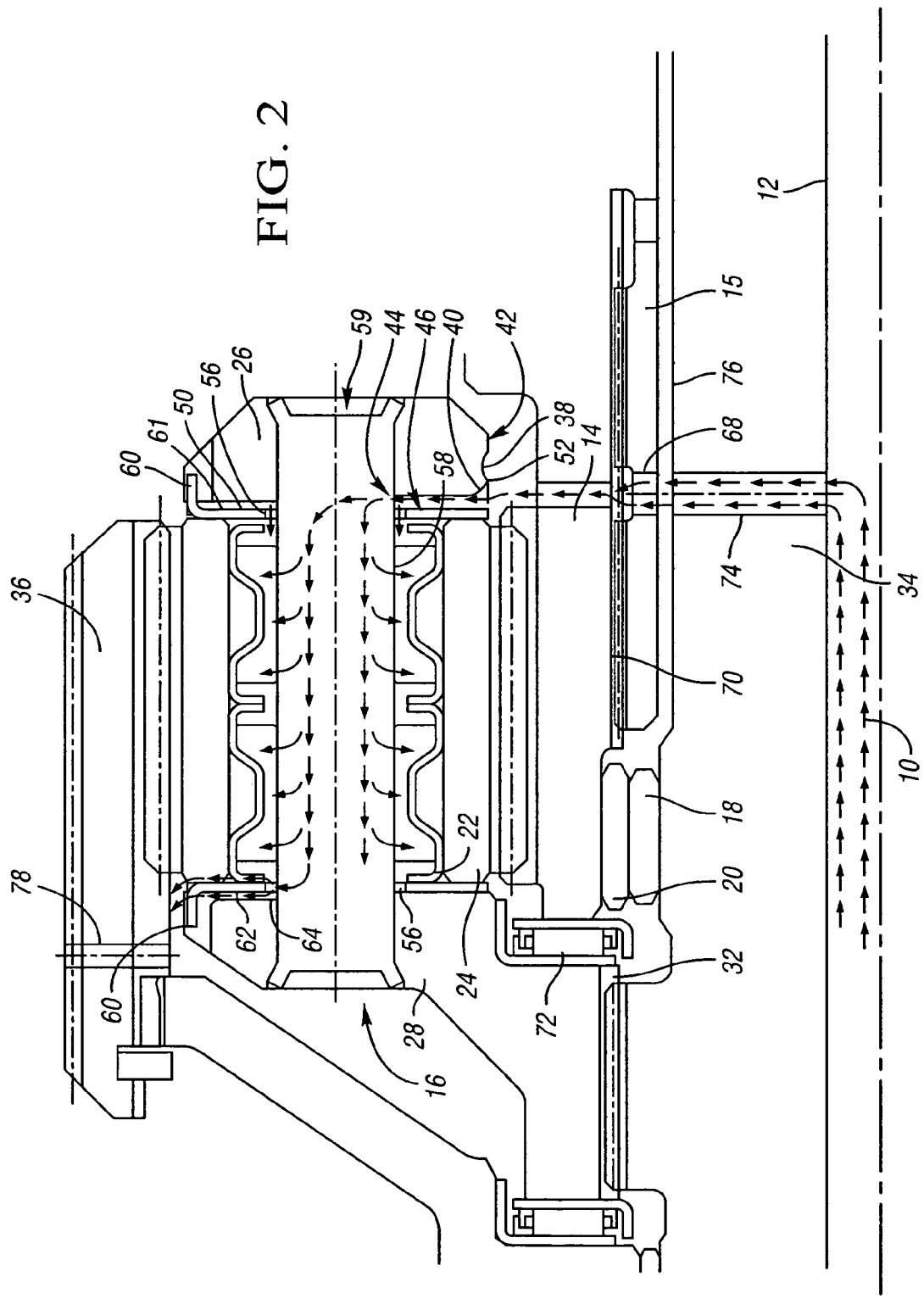
FIG. 2 a fragmentary cross-sectional view of the planetary carrier taken along one side of the centerline of the front portion of the electro-mechanical transmission to schematically show oil flow to and through the planetary carrier.

The lubricating material 10 is directed through the transmission by pressurizing the inner cavity of the transmission. In the preferred embodiment, a pump (not shown) sends the lubricating material 10, as shown in FIG. 2, from a source at 30 p.s.i. to the inner diameter of the main shaft 12. To maintain the desired pressure level, the transmission components are designed to nest substantially close with respect to each another. This significantly seals the connection between the components and prevents the lubricating material 10 from flowing in unintended areas. For example, in FIG. 2, the sun gear 14—adjacent to the planetary carrier 16—rests on a bushing 18 and steel sleeve 20 that substantially prevent the lubricating material 10 from flowing away from the planetary carrier 16. Therefore, the bushing 18 and steel sleeve 20 help to maintain the desired pressure level in the vicinity of the planetary carrier 16 so that the lubricating material 10 can successfully reach the pinion bearings 22 of the pinion gears 24.

Figure 4A:
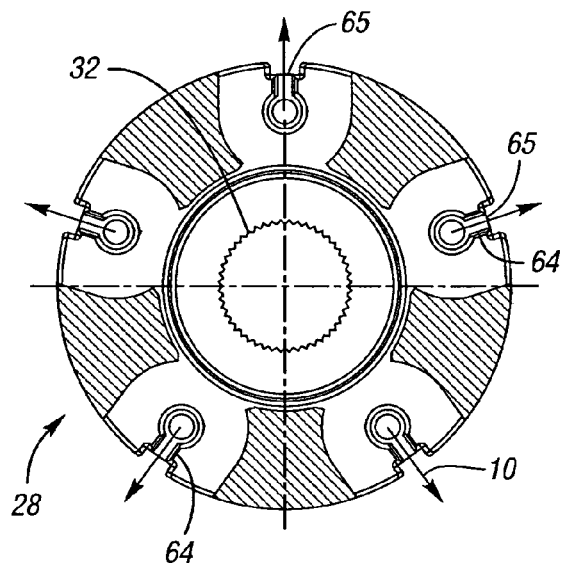
FIG. 4a is a front or face view of the grooved flange section of the planetary carrier showing five grooved areas for receiving a thrust washer like in FIG. 3.
Figure 4B:
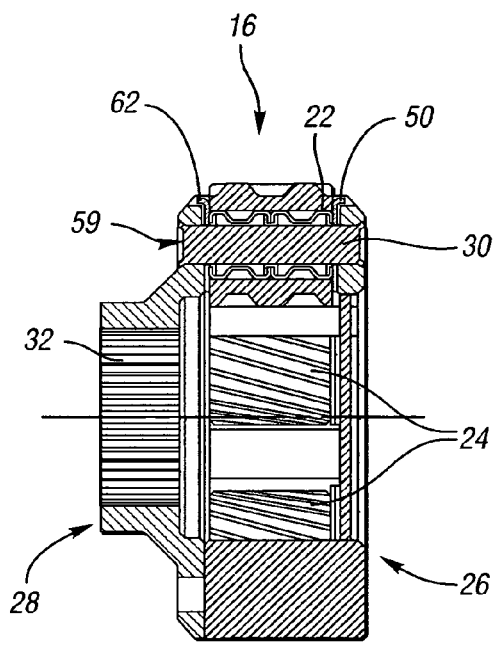
FIG. 4b is a cross-sectional side view of the planetary carrier partially in elevation.
Figure 4C:
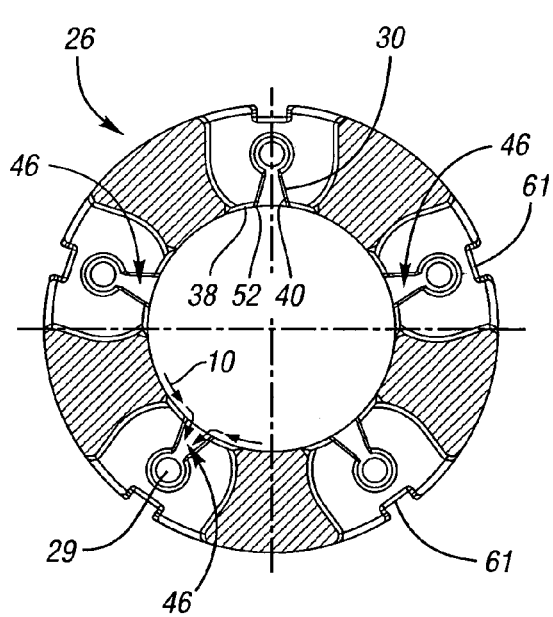
FIG. 4c is a front or face view of the grooved spider section of the planetary carrier showing five grooved areas for receiving a thrust washer like in FIG. 3.

The planetary carrier 16 consists of at least one pinion gear 24 (three of the five are shown in FIG. 4b) and a two-piece housing defined by a spider section 26 and a flange section 28 which are sintered brazed together. The face of the spider section 26 of the planetary carrier 16 is shown in FIG. 4c. The spider section 26 contains cylindrical openings 29 to receive posts 30 which add stiffness and strength to the planetary carrier 16 to react the pinion bearing 22 loading. FIG. 4a shows the face of the flange section 28, which is the more frontward portion of the planetary carrier 16. The flange section 28 contains splines 32, which connect the planetary carrier 16 to the main shaft 34, as shown in FIG. 2, and transmit power to the rear of the transmission (not shown).

As shown in FIG. 2, the planetary carrier 16 is designed so that the pinion gears 24 are in a drivable relationship with a sun gear 14 and ring gear 36. Together, the three gear types (14, 24 and 36) encircle the main shaft 34 of the transmission and through engagement with clutches (not shown) determine the output speed of the transmission. One technical advantage of this invention is in the redesign of the spider section 26 and flange section 28 of the planetary carrier 16. The spider section 26 of the planetary carrier 16 has five grooved areas, each having a first and second groove formed therein (38 and 40 respectively). The grooves 38, 40 have several functions including, directing the lubricating material 10 from the inner diameter of the planetary carrier 42 to the pinion bearings 22 at the inner diameter of the pinion gears 44.

Each first groove 38, as shown in FIG. 4c, is concave, facing the inner diameter of the planetary carrier 42 so as to receive lubricating material 10 from the sun gear 14 and sun gear shaft 15. The first groove 38 is also segmentally annular, extending about the inner diameter of the planetary carrier 42 in each first groove. The first groove 38 is intersected by a second groove 40, which extends radially to intersect the first groove 38 and radially along the grooved spider section 26 of the planetary carrier 16 to transfer the lubricating material 10 into a first pocket 46. In the preferred embodiment, the second groove 40 is formed in the spider section 26 of the planetary carrier 16 by an alteration to the die (not shown) of the planetary carrier 16. Formed by a powder metallurgy process, the planetary carrier 16 is constructed with a die having a protrusion defining the second formed groove 40. Powder metallurgy was chosen because the process is ideal for parts with irregular curves or for small recesses that are difficult to machine. Moreover, the process reduces the amount of material waste since the intricacies of the part can be included in the die instead of being sculpted from a blank through a series of machining processes.

Still, powder metallurgy has its limitations. The intricacies of the die must be such that the part is removable from the die. For this reason, in the preferred embodiment, the first groove 38 was machined into the spider section 26 of the planetary carrier 16. The first groove 38 was designed to intersect the second groove 40 (as shown in FIG. 4c) and transfer the lubricating material 10 radially into the first pocket 46 where a first thrust washer 50 will aid in directing the lubricating material 10 into the pinion bearings 22. The intersection between the first groove 38 and second groove 40 forms a shoulder at 52, which acts as a dam to substantially prevent oil from escaping the pinion area of the spider section 26 of the planetary carrier 16. The second groove 40 leads to and defines the first pocket 46 that extends radially to the inner diameter the pinion gear 44 where an axial slot 56 in the first thrust washer 50 receives the lubricating material 10.

Figure 3:
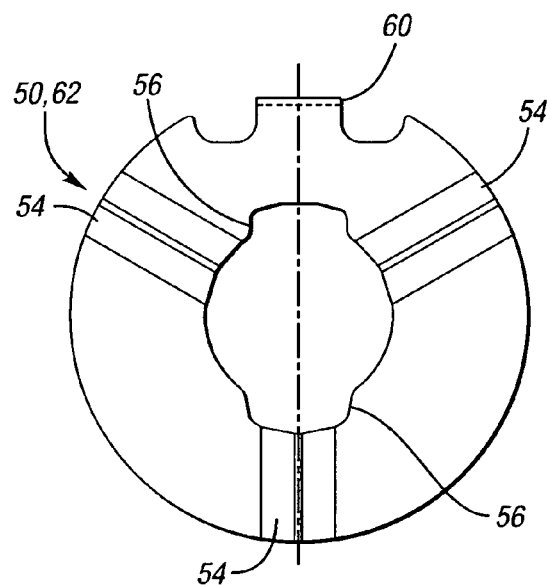
FIG. 3 is a front view of a thrust washer.

Adjacent to the first pocket 46 is the first thrust washer 50, which is better shown in FIG. 3. The first thrust washer 50 has radially extending slots 54 (or conned depressions) spanning across the face of the first thrust washer 50. The radially extending slots 54 in the first thrust washer 50 serve to direct the lubricating material 10 toward the first pocket 46, as shown in FIG. 2. In the preferred embodiment, the thrust washer 50 also has axial slots 56 (or notches), shown in FIGS. 2 and 3, which, along with groove 40, carry the lubricating material 10 to the spindle 58 and bearings 22 of the pinion gear 24 where the spindle 58 is supported or press fit into the carrier bore 59. Moreover, the first thrust washer 50 also has a flanged edge 60. The flanged edge 60 extends axially into the radially extending flange slots 61 of the spider section 26 and functions to keep each washer from rotating with respect to the spider section 26 of the planetary carrier 16 by nesting in the spider section 26 at 61 (as shown in FIGS. 2 and 4*c*).

From the first thrust washer 50, the lubricating material 10 is directed to the pinion bearings 22. The pinion bearings 22, as shown in FIG. 2, are aligned axially along the spindle 58. The pinion bearings 22 act to provide support for the pinion gear 24. Since the pinion gears 24 are in a drivable relationship with the ring gear 36 as well as the sun gear 14, the pinion bearings 22 see a substantial amount of loading during operation of the transmission. Therefore, this area requires lubrication for cooling to enhance the lifecycle of the pinion bearings 22.

Also shown in FIG. 2, a second thrust washer 62 is attached to the pinion gear 24. Each second thrust washer 62 has radially and axially extending slots similar to 54 and 56 shown in FIG. 3. The slots of the second thrust washer 62 are operative to direct the lubricating material 10 axially away from the spindle 58 of the pinion gear 24 through axial slot 56 and towards a third groove 64 formed in the flanged section 28 of the planetary carrier 16. The second thrust washer 62 also has a flanged edge 60 which nests in the flange section 28 at 65 (as shown in FIG. 4*a*). From each third groove 64, the lubricating material 10 exits the planetary carrier 16 and is directed to other transmission components (not shown) for cooling and is eventually returned to the transmission sump for reuse.

The configuration of transmission components adjacent to the planetary carrier 16 also assists in directing the lubricating material 10 to the spider section 26 of the planetary carrier 16 and into the pinion bearings 22. The sun gear shaft 15 for example, which encircles the main shaft 34, has at least one radially extending aperture 68 to direct the lubricating material 10 from the inner diameter of the main shaft 12 to the sun gear 14 and eventually the spider section 26 of the planetary carrier 16. The sun gear shaft 15 is attached to the sun gear 14 by a section of splines 70 between the sun gear 14 and sun gear shaft 15. The sun gear 14 is adjacent to a thrust bearing 72, which further restricts the passage of the lubricating material 10 away from the planetary carrier 16 and its pinion gears 24. Moreover, the main shaft 34 is fitted with apertures like 74 that extend radially and direct the lubricating material 10 from the inner diameter of the main shaft 12 to the outer diameter of the main shaft 76. The apertures—68 and 74—are designed to be large enough to permit the passage of the lubricating material 10 but small enough to maintain the pressure in the cavity of the planetary carrier 16. Lastly, the ring gear 36 also has a radially extending aperture 78 to permit the lubricating material 10 to exit the planetary carrier 16.

While the best modes for carrying out the invention have been described in detail, those familiar with the art to which this invention relates will recognize various alternative designs and embodiments for practicing the invention within the scope of the appended claims.

The invention claimed is:

1. A lubrication system for a planetary carrier of an automatic transmission comprising:
   a source of lubricating material;
   a main shaft configured to receive said lubricating material from said source and direct said lubricating material toward the planetary carrier, wherein said main shaft has a substantially radially extending aperture operative to direct said lubricating material from said main shaft toward said planetary carrier;
   the planetary carrier having a spider section and a flange section with at least one pinion gear therebetween being mounted on a pinion bearing;
   a sun gear shaft adjacent said main shaft to receive said lubricating material from said main shaft and including a substantially radially extending aperture to carry and further direct said lubricating material toward the planetary carrier;
   said spider section having a first groove formed therein to receive said lubricating material being directed from said sun gear shaft toward the planetary carrier and a second groove which intersects said first groove, wherein said second groove is formed therein to receive said lubricating material from said first groove and direct said lubricating material toward said pinion bearing; and
   a first thrust washer adjacent to said second groove between said pinion bearing and said spider section, wherein said first thrust washer has an axially extending slot operative to direct said lubricating material toward said pinion bearing.

2. The automatic transmission of claim 1, further comprising:
   a sun gear in drivable relationship with said sun gear shaft;
   a seal and/or bushing between said sun gear and said main shaft and operative to support said sun gear shaft and confine said lubricating material being directed towards the planetary carrier;
   wherein said intersection between said first groove and second groove is sufficiently configured as a dam to substantially prohibit said lubricating material from being directed away from the planetary carrier.

3. The automatic transmission of claim 1, further comprising:
   a second thrust washer located at said flange section of the planetary carrier and having an axially extending slot operative to direct said lubricating material axially away from said pinion bearing.

4. The automatic transmission of claim 3, wherein said second thrust washer has a radially extending slot intersecting said axially extending slot, operative to further direct said lubricating material away from said pinion bearing.

5. The automatic transmission of claim 3, wherein said second thrust washer has a radially extending slot intersecting said axially extending slot, operative to further direct said lubricating material axially away from said pinion bearing.

6. The automatic transmission of claim 1, wherein said flange section of the planetary carrier has a third groove formed therein adjacent to and in cooperation with said axially extending slot and said radially extending slot in said second thrust washer to receive said lubricating material from said pinion bearing and direct said lubricating material away from the planetary carrier for cooling and/or recycling.

7. The automatic transmission of claim 1, wherein said first groove in said spider section and said second groove in said flange section of the planetary carrier are sufficiently radially oriented to provide a sufficiently constant flow path for lubricating material to maximize flow to the planetary carrier.

8. The automatic transmission of claim 1, wherein said substantially radially extending aperture in said main shaft is a drilled hole.

9. The automatic transmission of claim 6, wherein at least one of said first groove, said second groove, and said third groove of the planetary carrier is produced from a powder metal process which allows multiple features to be formed without subsequent machining operations.

10. The automatic transmission of claim 1, wherein one of said first and said second grooves in at least one of said spider section and flange section of the planetary carrier is produced from a machining process.

11. The automatic transmission of claim 1, wherein one of said spider section and said flange section supports a spindle for said pinion bearing; and wherein one of said first and said second grooves extends to said spindle.

12. The automatic transmission of claim 2, wherein the drivable relationship of said sun gear with said sun gear shaft is enabled by splines.

13. An automatic transmission with a lubrication system for a planetary carrier, comprising:
    a source of lubricating material;
    a main shaft configured to receive said lubricating material from said source and direct the lubricating material toward the planetary carrier;
    wherein said main shaft has a substantially radially extending aperture operative to direct the lubricating material from said main shaft toward the planetary carrier;
    a sun gear shaft adjacent said main shaft to receive the lubricating material from said main shaft and including a substantially radially extending aperture to carry and further direct the lubricating material toward the planetary carrier;
    a sun gear in drivable relationship with said sun gear shaft;
    a seal and/or bushing between said sun gear and said main shaft operative to support said sun gear shaft and confine said lubricating material being directed towards the planetary carrier;
    the planetary carrier having a spider section and a flange section with at least one pinion gear therebetween and being mounted on a pinion bearing;
    wherein said spider section of the planetary carrier has a first groove formed therein to receive said lubricating material being directed from said sun gear shaft toward the planetary carrier;
    wherein said spider section of the planetary carrier has a second groove which intersects said first groove; wherein said second groove is formed therein to receive said lubricating material from said first groove and direct said lubricating material toward said pinion bearing; and
    a first thrust washer adjacent to said second groove between said pinion bearing and said spider section of the planetary carrier; wherein said first thrust washer has a slot operative, in cooperation with said second groove, to receive the lubricating material and further direct the lubricating material toward said pinion bearing.

14. A method of lubricating a planetary carrier of an automatic transmission having a pair of thrust washers each having an axially-extending slot, the method comprising:
    directing a lubricating material to the planetary carrier, which has a spider section and a flange section with at least one bearing mounted pinion gear therebetween, including:
        directing said lubricating material through a first groove in said spider section of the planetary carrier toward said pinion bearing;
        directing said lubricating material through a second groove in said flange section of the planetary carrier away from said pinion bearing;
        directing said lubricating material to the pinion carrier through the axially extending slot of one of the pair of thrust washer, and directing said lubricating material away from the pinion bearing through the axially extending slot in the other of the pair of thrust washers.

15. A method of lubricating the planetary carrier of an automatic transmission, comprising:
    directing a lubricating material from a source in the transmission to the planetary carrier having a spider section and a flange section with at least one bearing mounted pinion gear therebetween including:
        directing said lubricating material from a main shaft to a sun gear shaft, wherein said sun gear shaft has a radially extending aperture through which said lubricating material can carry;
        directing said lubricating material through said radially extending aperture in said sun gear shaft to the planetary carrier;
        receiving said lubricating material in a first groove in said spider section of the planetary carrier from said radially extending aperture in said sun gear shaft;
        directing said lubricating material along said first groove to a first thrust washer having an axially extending slot;
        directing said lubricating material through said axially extending slot in said first thrust washer to said pinion bearing;
        directing said lubricating material across said pinion bearing to a second thrust washer located at said flange section of the planetary carrier and having an axially extending slot for receiving said lubricating material from said pinion bearing;
        directing said lubricating material received from said pinion bearing through said axially extending slot in said second thrust washer to a third groove in said flange section of the planetary carrier; and
        carrying said lubricating material away from the planetary carrier through said third groove of said flange section of the planetary carrier.

* * * * *